(12) United States Patent
Gunther et al.

(10) Patent No.: US 8,972,254 B2
(45) Date of Patent: Mar. 3, 2015

(54) TURBO PROCESSING FOR SPEECH RECOGNITION WITH LOCAL-SCALE AND BROAD-SCALE DECODERS

(75) Inventors: Jacob Gunther, North Logan, UT (US); Todd Moon, Providence, UT (US)

(73) Assignee: Utah State University, Logan, UT (US)

( * ) Notice: Subject to any disclaimer, the term of this patent is extended or adjusted under 35 U.S.C. 154(b) by 329 days.

(21) Appl. No.: 13/536,717

(22) Filed: Jun. 28, 2012

(65) Prior Publication Data

US 2013/0006631 A1 Jan. 3, 2013

Related U.S. Application Data

(60) Provisional application No. 61/502,177, filed on Jun. 28, 2011.

(51) Int. Cl.
| G10L 15/00 | (2013.01) |
| G10L 15/14 | (2006.01) |
| G10L 15/16 | (2006.01) |
| G10L 15/30 | (2013.01) |

(52) U.S. Cl.
CPC .................................... G10L 15/30 (2013.01)
USPC .......................... 704/231; 704/232; 704/256.1

(58) Field of Classification Search
CPC ......... G10L 15/00; G10L 15/14; G10L 15/16; G10L 15/30
USPC ................. 704/231, 232, 236, 251, 253, 256, 704/256.1; 375/340
See application file for complete search history.

(56) References Cited

U.S. PATENT DOCUMENTS

| 5,600,753 | A | * | 2/1997 | Iso | 704/200 |
| 5,987,414 | A | * | 11/1999 | Sabourin et al. | 704/270 |
| 6,208,963 | B1 | * | 3/2001 | Martinez et al. | 704/232 |
| 6,442,520 | B1 | * | 8/2002 | Buhrke et al. | 704/255 |
| 6,885,711 | B2 | * | 4/2005 | Shiu et al. | 375/340 |
| 8,276,037 | B2 | * | 9/2012 | Ancora et al. | 714/752 |
| 2004/0181406 | A1 | * | 9/2004 | Garrett, et al. | 704/242 |
| 2004/0225949 | A1 | * | 11/2004 | Coombs et al. | 714/796 |
| 2012/0053944 | A1 | * | 3/2012 | Tuzel et al. | 704/256 |
| 2014/0164002 | A1 | * | 6/2014 | ZHANG et al. | 704/504 |

OTHER PUBLICATIONS

Shivappa et al., "Multimodal Information Fusion using the Iterative Decoding Algorithm and Its Application to Audio-Visual Speech Recognition", IEEE International Conference on Acoustics, Speech and Signal Processing, 2008, ICASSP 2008, Mar. 31-Apr. 4, 2008, pp. 2241-2242.*

(Continued)

*Primary Examiner* — Martin Lerner (57) ABSTRACT

Environmental recognition systems may improve recognition accuracy by leveraging local and nonlocal features in a recognition target. A local decoder may be used to analyze local features, and a nonlocal decoder may be used to analyze nonlocal features. Local and nonlocal estimates may then be exchanged to improve the accuracy of the local and nonlocal decoders. Additional iterations of analysis and exchange may be performed until a predetermined threshold is reached. In some embodiments, the system may comprise extrinsic information extractors to prevent positive feedback loops from causing the system to adhere to erroneous previous decisions.

29 Claims, 6 Drawing Sheets

(56) References Cited

OTHER PUBLICATIONS

Choueiter et al., "A Turbo-Style Algorithm for Lexical Baseforms Estimation", IEEE International Conference on Acoustics, Speech and Signal Processing, ICASSP 2008, Mar. 31-Apr. 4, 2008, pp. 4313-4316.*

Gunther, J. et al, "Turbo Processing for Speech Recognition", IEEE Transactions on Cybernetics, 2013.

* cited by examiner

TURBO PROCESSING FOR SPEECH RECOGNITION WITH LOCAL-SCALE AND BROAD-SCALE DECODERS

RELATED APPLICATIONS

This application claims the benefit of U.S. Provisional Application No. 61/502,177, filed Jun. 28, 2011, the entire disclosure of which is incorporated by reference herein.

STATEMENT REGARDING FEDERALLY SPONSORED RESEARCH OR DEVELOPMENT

The invention was made with support from the U.S. Government under Grant No. H98230-09-1-0108, which was awarded by the National Security Agency (NSA). The U.S. Government may have certain rights in the invention.

TECHNICAL FIELD

This disclosure relates to systems and methods for recognizing speech in a speech signal.

DETAILED DESCRIPTION OF PREFERRED EMBODIMENTS

The functionality and usability of computer devices may be greatly enhanced by improving the ability of the computer devices to understand and/or interact with their environment. The recognition of an object or a target by a computer device is referred to herein as environmental recognition. Environmental recognition may include understanding human communication, such as speech recognition, gesture recognition, facial expression recognition, and the like, or understanding objects in an environment, such as using image pattern recognition or pose estimation. The environmental recognition disclosed herein is not limited to real-time and/or real-world recognition. For example, environmental recognition may be disparate in time and space from the event being analyzed, such as when recognizing prerecorded speech or a prerecorded image. Additionally, environmental recognition may be applied to digitally created objects, such as speech synthesized from text or a computer drawn image. Those of skill in the art will recognize other applications of environmental recognition systems.

An environmental recognition system may use multiple scales of recognition to improve accuracy. A first scale may be a local scale focused on a single element of the recognition target. A second scale may be a nonlocal scale, also referred to as a global scale, a broad scale, or a wide scale, that comprises a plurality of local elements or elements derived from local elements. High-performance environmental recognition may be achieved by synergistically analyzing the local-scale and broad-scale features of the recognition target. Although discussion of specific embodiments is directed to systems operating over two scales, three or more scales may be used in some embodiments.

The environmental recognition system may comprise a first, local-scale decoder to recognize local-scale features and a second, broad-scale decoder to recognize broad-scale features. Each decoder may make soft recognition decisions about the features being analyzed. The soft decisions result in soft information as to whether a feature matches an element in a library or set. The soft information is referred to as soft because probabilistic information about multiple elements in the library or set is returned, rather than a hard decision as to the most likely element. The probabilistic information may be represented in the form of probabilities, likelihoods, likelihood ratios, log-likelihood ratios, or the like. In some embodiments, soft information about less than all library or set elements is used, and soft information about the remaining elements can be reconstructed from the soft information provided.

The soft information is then exchanged by the decoders. The decoders produce updated soft information based on the exchanged soft information. The process of exchanging and updating is continued until the soft information converges to a fixed value and/or a predetermined number of iterations is reached. In some embodiments, the exchanging and updating will end upon convergence unless a predetermined number of iterations occurs first.

The environmental recognition system may further comprise extrinsic information extractors that process the soft information from each decoder before the soft information is delivered to the other decoder. The extrinsic information extractor receives the extrinsic information input and soft information output by the corresponding decoder. The extrinsic information extractor then removes the effects of the extrinsic information input on the soft information.

In some embodiments, each decoder and each extractor may comprise a dedicated processor. Alternatively, one processor may be used to implement a decoder and an extractor, or the entire system may be implemented by a computer system. The embodiments may include various steps, which may be embodied in machine-executable instructions to be executed by a computer system. A computer system comprises one or more general-purpose or special-purpose computers (or other electronic devices). Alternatively, the computer system may comprise hardware components that include specific logic for performing the steps or comprise a combination of hardware, software, and/or firmware.

A computer system may comprise a workstation, laptop computer, disconnectable mobile computer, server, mainframe, cluster, so-called "network computer" or "thin client," tablet, smart phone, personal digital assistant or other handheld computing device, "smart" consumer electronics device or appliance, or a combination thereof.

Each computer system includes at least a processor and a memory; computer systems may also include various input devices and/or output devices. The processor may include one or more general-purpose central processing units (CPUs), graphic processing units (GPUs), or Digital Signal Processors (DSPs), such as Intel®, AMD®, Nvidia®, ATI®, TI®, or other "off-the-shelf" microprocessors. The processor may include a special-purpose processing device, such as ASIC, PAL, PLA, PLD, Field Programmable Gate Array (FPGA), or other customized or programmable device. The memory may include static RAM, dynamic RAM, flash memory, ROM, CD-ROM, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

Embodiments may also be provided as a computer program product, including a machine-readable storage medium having stored thereon instructions that may be used to program a computer (or other electronic device) to perform processes described herein. The machine-readable storage medium may include, but is not limited to, hard drives, floppy diskettes, optical disks, CD-ROMs, DVD-ROMs, ROMs, RAMs, EPROMs, EEPROMs, magnetic or optical cards, tapes, solid-state memory devices, or other types of media/machine-readable media suitable for storing electronic instructions.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, comprise one or more physical or logical blocks of computer instructions, which may be organized as a routine, a program, an object, a component, a data structure, etc., that performs one or more tasks or implements particular abstract data types.

In certain embodiments, a particular software module may comprise disparate instructions stored in different locations of a memory device, different memory devices, or different computers, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general-purpose computers, computer programming tools and techniques, computer networks and networking technologies, and digital storage media.

Figure 1:
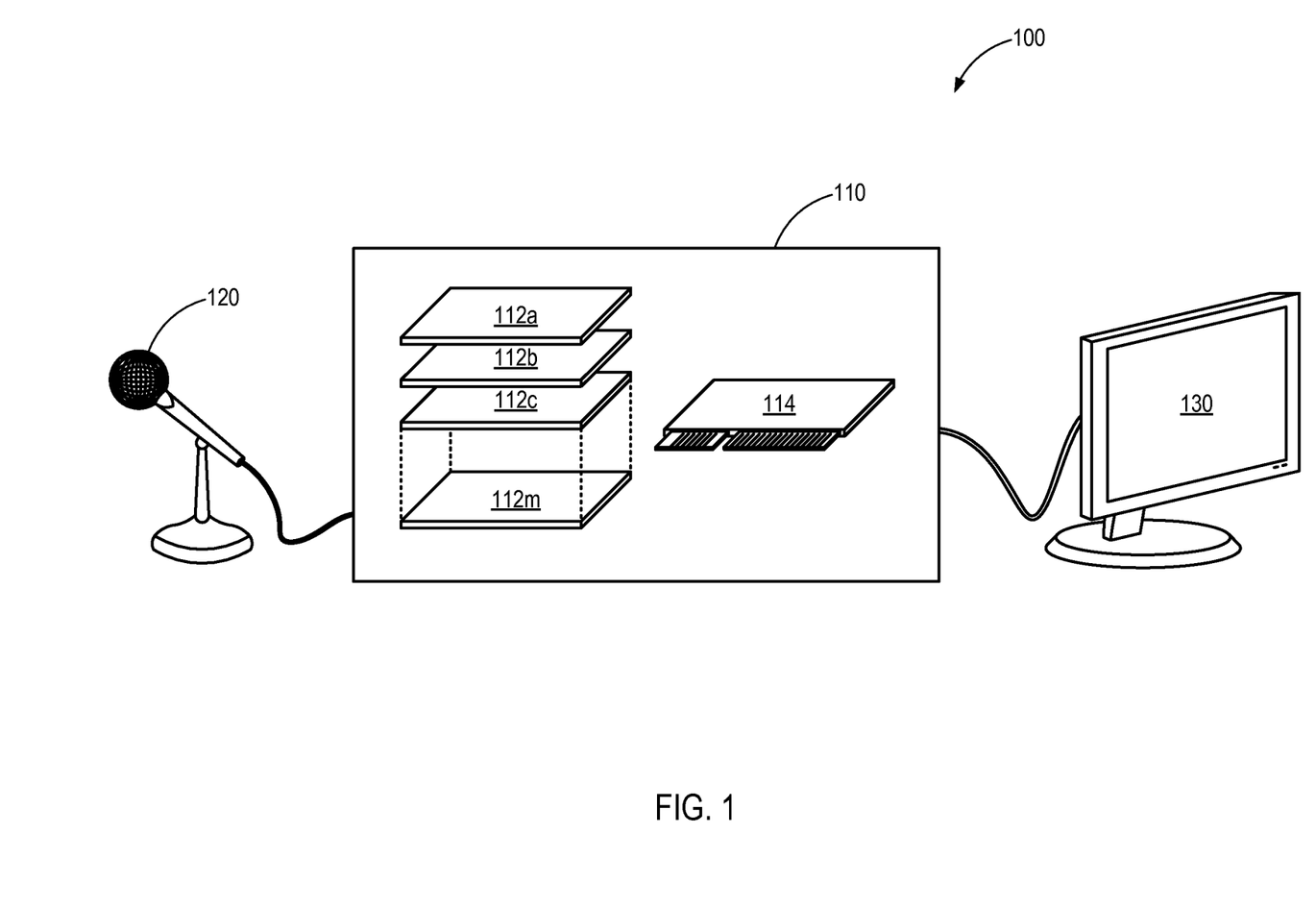
FIG. 1 is a schematic diagram of a speech-to-text conversion system comprising a speech recognition system.

FIG. 1 is a schematic diagram of a speech-to-text conversion system 100 comprising a speech recognition system 110. In the depicted embodiment, the system 100 comprises a microphone 120 to convert sound waves into an audio signal. The audio signal comprises a digital representation of the sound waves detected by the microphone 120. The microphone 120 may comprise an analog-to-digital converter to convert an analog representation of the sound waves into a digital audio signal, or a separate analog-to-digital converter may be used to perform the conversion. In other embodiments, the audio signal may be loaded from a storage device or received from another system.

The audio signal may or may not comprise speech. When the audio signal comprises speech, the speech within the audio may be referred to as a speech signal. In some embodiments, a preprocessor (not shown) may determine whether speech is present in an audio signal. The preprocessor may pass only speech signals to the speech recognition system. The preprocessor may also remove or otherwise separate some or all non-speech noise from the audio signal and/or the speech signal and/or convert the speech signal into blocks.

Once the speech signal has been acquired, the speech recognition system 110 may attempt to recognize the speech. Recognizing the speech, or speech recognition, may comprise converting the speech to a language representation of the speech, such as text, symbols, numerical representation, electrical representations (e.g. non-transitory storage in memory, graphical representations, text representations, or the like), language element representations, or the like. For example, speech recognition performed by the speech recognition system 110 may result in hard symbol decisions, such symbols, text, or the like. Language elements may comprise words, phonemes, allophones, or the like.

A monitor 130 may display text to a user in the illustrated embodiment. The monitor 130 may be directly wired to the speech recognition system 110, or the monitor 130 may be connected to the speech recognition system 110 via a wired or wireless network. In alternative embodiments, the text may be stored for later use, or a processor may interpret the text as a command and perform one or more operations based on the text.

The speech recognition system 110 may comprise a memory 114 to store one or more modules for performing the speech recognition. The speech recognition system may also comprise one or more processors 112$a$-$m$. The one or more processors 112$a$-$m$ may be GPUs or DSPs, which may be particularly suited to the vector manipulation used in speech recognition. By using multiple processors, the speech recognition may be computed in real time.

Figure 2:
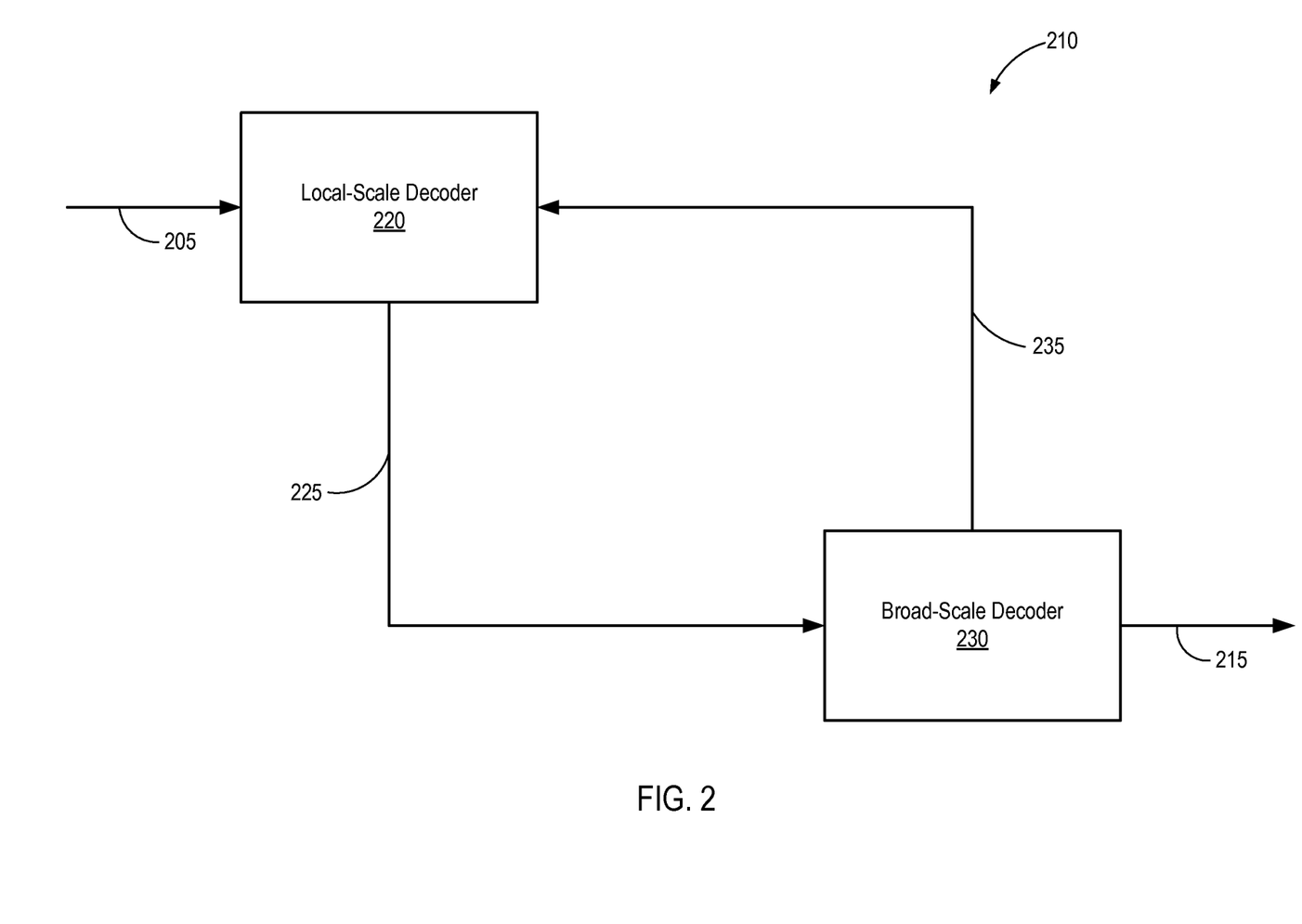
FIG. 2 is a block diagram of a speech recognition system comprising a local-scale decoder and a broad-scale decoder.

FIG. 2 is a block diagram of a speech recognition system 210 comprising a local-scale decoder 220 and a broad-scale decoder 230. The local scale for speech recognition may comprise allophone recognition, phoneme recognition, word recognition, or the like. Each allophone, phoneme, or word may be referred to as a symbol. The broad scale for speech may be words, n-grams, or grammar. The broad-scale decoder may use the words, n-grams, or grammar to apply constraints across a plurality of symbols.

In the depicted embodiment of FIG. 2, the broad-scale decoder 230 receives as inputs local soft information in the form of local-scale soft symbol estimates 225 from the local-scale decoder 220 rather than directly analyzing the speech signal 205. However, in other embodiments, the broad-scale decoder 230 may instead analyze raw data, such as the speech signal 205 and/or an audio signal. Also, broad-scale soft symbol estimates 235 from the broad-scale decoder 230 are fed back to the local-scale decoder 220. Because the decoders 220, 230 share information with each other that would otherwise be unavailable, the performance of each decoder 220, 230 is improved, as is the performance of the overall system 210.

When a speech signal 205 is received by the speech recognition system 210, it may initially be processed by a feature extractor (not shown). The feature extractor may be part of the local-scale decoder 220, may be part of the preprocessor (not shown), or it may operate separately. The feature extractor converts a received speech signal 205 into a plurality of feature vectors. Each feature vector is a representation of features of the speech signal 205 at a time t. The plurality of speech vectors may then be represented as $Y=Y_1, Y_2, \ldots, Y_T \equiv Y_1^T$, wherein $Y_t$ comprises the feature vector at time t, T is the number of feature vectors, and $Y_1^T$ comprises the speech vectors from time 1 to time T. The local-scale decoder 220 also receives a plurality of broad-scale soft symbol estimates 235. As will be discussed in more detail below, each soft symbol estimate may comprise a plurality of phoneme probabilities. The plurality of broad-scale soft symbol estimates 235 may be represented as $E=E_1, E_2, \ldots, E_T \equiv E_1^T$, wherein $E_t$ comprises the vector of probabilities at time t and $E_1^T$ comprises the probability vectors from time 1 to time T. For the first iteration, the vector of probabilities may be set to the uniform distribution.

In some embodiments, the local-scale decoder 220 may implement a hidden Markov model (HMM) of each symbol. In other embodiments, other stochastic models may be used including neural networks and the like. Each HMM may comprise a plurality of states, such as 3, 5, 8, or 10 states or the like, and may be a left-right HMM or an ergodic HMM. The type of HMM and number of states may depend on whether the local-scale decoder 220 is examining allophones, phonemes, words, or some other scale. The HMMs for each symbol may be stacked to form a larger HMM that is representative of a sentence or block of phonemes and allows for continuous speech recognition. For example, for a phoneme decoder with a 39 phoneme library and an HMM with 3 states for each phoneme, the stacked HMM may comprise a 117 HMM.

The local-scale decoder 220 may then compute local-scale soft symbol estimates 225. This may comprise finding the probability of being in a state i at each time t given the features and broad-scale soft symbol estimates 235 received by the local-scale decoder 220. If $\Psi_t$ is used to represent the state of the HMM at time t and $N_S$ represents the number of states in the HMM, then this probability may be written $P(\Psi_t=i|Y,E)$. A forward-backward algorithm incorporating prior probabilities may be used to compute $P(\Psi_t=i|Y,E)$. In some embodiments, the forward-backward algorithm incorporating prior probabilities may be computed according to:

$$P(\Psi_t = i | Y, E) = \frac{\alpha_t(i)\beta_t(i)}{\sum_{k=1}^{N_S} \alpha_t(k)\beta_t(k)} \quad (1)$$

wherein $\alpha_t(i)$ is a forward probability incorporating prior probabilities and $\beta_t(i)$ is a backward probability incorporating prior probabilities.

The forward probability incorporating prior probabilities may be defined as the probability of observing the features $Y_1^t$ and the broad-scale soft symbol estimates $E_1^t$ and of being in state i at time t, that is $P(Y_1^t, E_1^t, \Psi_t=i)$. The forward probability incorporating prior probabilities may be computed recursively according to the equations:

$$\alpha_1(i) = P(\Psi_1 = i)f(Y_1 | \Psi_1 = i)P_1(i) \quad (2)$$

$$\alpha_{t+1}(j) = \sum_{i=1}^{N_S} \alpha_t(i)a_{ij}f(Y_{t+1} | \Psi_{t+1} = j)P_{t+1}(j) \quad (3)$$

wherein $a_{ij}$ is the transition probability from state i to state j, that is $P(\Psi_{t+1}=j|\Psi_t=i)$; wherein $f(Y_{t+1}|\Psi_{t+1}=j)$ is the probability of observing the features $Y_{t+1}$ at time t+1 given a state j, that is $P(Y_{t+1}|\Psi_{t+1}=j)$; and wherein $P_{t+1}(j)$ is the soft symbol estimate for the phoneme associated with state j at time t+1, which is equivalent to $P(E_{t+1}|\Psi_{t+1}=j)$.

The backward probability incorporating prior probabilities may be defined to be the probability of observing the features $Y_{t+1}^T$ and the broad-scale soft symbol estimates $E_{t+1}^T$ given the state at time t is i, that is $P(Y_{t+1}^T, E_{t+1}^T, \Psi_t=i)$. The backward probability incorporating prior probabilities may also be computed recursively. It may be computed according to the equations:

$$\beta_T(i) = 1 \quad (4)$$

$$\beta_t(i) = \sum_{j=1}^{N_S} a_{ij}f(Y_{t+1} | \Psi_{t+1} = j)P_{t+1}(j)\beta_{t+1}(j) \quad (5)$$

wherein $a_{ij}$, $f(Y_{t+1}|\Psi_{t+1}=j)$, and $P_{t+1}(j)$ are defined as before. The probabilities $P(\Psi_1=i)$, $a_{ij}$, and $f(Y_{t+1}|\Psi_{t+1}=j)$ may be preselected or may be generated using a training speech signal where the desired text has been predetermined.

Because the one or more HMMs may comprise multiple states per symbol, the state probabilities, $P(\Psi_t=i|Y,E)$, may be converted to symbol probabilities for each time t. In some embodiments, this conversion may comprise marginalizing the probability of being in any of the states associated with each symbol at time t. The results may be stored in an array of probabilities of size $N_P$ by T, wherein $N_P$ is the number of symbols. This array of probabilities may be used as the local-scale soft symbol estimates 225 to be transmitted to the broad-scale decoder 230.

The broad-scale decoder 230 may look at symbol-to-symbol transition probabilities. The transition probabilities may comprise phoneme-to-phoneme probabilities within words or n-grams and/or word-to-word probabilities within n-grams or grammar. The broad-scale decoder 230 may input the local-scale soft symbol estimates 225 from the local-scale decoder 220 and create broad-scale soft symbol estimates 235 based on the local-scale soft symbol estimates 225 and transition probabilities.

The broad-scale decoder 230 may also be implemented as one or more HMMs in some embodiments. For example, a phoneme-to-word HMM may be used wherein each word is modeled as an HMM and each state represents a phoneme. As before, this may be a left-right HMM or an ergodic HMM. The HMMs may again be stacked to form a single larger HMM, which will allow for continuous speech recognition.

The broad-scale decoder 230 may compute broad-scale soft symbol estimates 235 in a manner similar to the local-scale decoder 220. However, in the illustrated embodiment, the broad-scale decoder 230 need only consider local-scale soft symbol estimates 225 from the local-scale decoder 220 and not the feature vectors. Thus, computing the broad-scale soft symbol estimates 235 may comprise finding the probability of being in a state i at each time t given the local-scale soft symbol estimates 225 received from the local-scale decoder 220, that is $P(\Psi_t=i|E)$, wherein E represents the local-scale soft symbol estimates 225. Equations (1)-(5) may be used by the broad-scale decoder 230 by removing the Y and $f(Y_{t+1}|\Psi_{t+1}=j)$ terms from the equations.

The broad-scale decoder 230 may produce phoneme probabilities or word probabilities as its broad-scale soft symbol estimates 235. In some embodiments, the broad-scale decoder 230 may return phoneme probabilities to the local-scale decoder 220 as broad-scale soft symbol estimates 235 and may output word probabilities as a final result. The phoneme probabilities may be computed by marginalizing the probability of being in that phoneme state across all the word HMMs. The word probabilities may be computed by marginalizing the probability of being in any state associated with each word.

Once the broad-scale decoder 230 has produced broad-scale soft symbol estimates 235, these may be sent to the local-scale decoder 220. The local-scale decoder 220 may then update its local-scale soft symbol estimates 225. Updating the local-scale soft symbol estimates 225 may comprise computing $P(\Psi_t=i|Y,E)$ using equations (1)-(5), wherein E comprises the broad-scale soft symbol estimates 235. The updated local-scale soft symbol estimates 225 may be used by the broad-scale decoder to update the broad-scale soft symbol estimates 235. Updating the broad-scale soft symbol estimates 235 may comprise computing $P(\Psi_t=i|E)$ as previously discussed, wherein E comprises the updated local-scale soft symbol estimates 225. After the initial local-scale and broad-scale soft symbol estimates 225, 235 are computed, each set of updates to the local-scale and broad-scale soft symbol estimates 225, 235 may be referred to as a turbo iteration.

The speech recognition system 210 may perform a plurality of turbo iterations. For example, the speech recognition system 210 may perform a predetermined number of turbo iterations, may iterate until determining when one or both of the sets of soft symbol estimates 225, 235 converge towards a steady state, or may finish iterating at the sooner of convergence and a predetermined number of turbo iterations. Determining convergence may comprise determining that less than a predetermined number of hard symbol decisions changed due to the turbo iteration and/or determining that the change in soft symbol estimates was less than a predetermined threshold.

Once the speech recognition system 210 determines that an appropriate number of turbo iterations have been performed, it may output the broad-scale soft symbol estimates 235 or output hard symbol decisions 215, such as symbols, text, or the like, based on the soft symbol estimates 225, 235. The hard symbol decisions 215 may be selected by choosing the most likely word at each time t or by using the Viterbi algorithm or the like to select the most likely sequence of words. Selection of the hard symbol decisions 215 may be performed by the broad-scale decoder 230, or a separate module (not shown) may make the hard symbol decisions 215.

Figure 3:
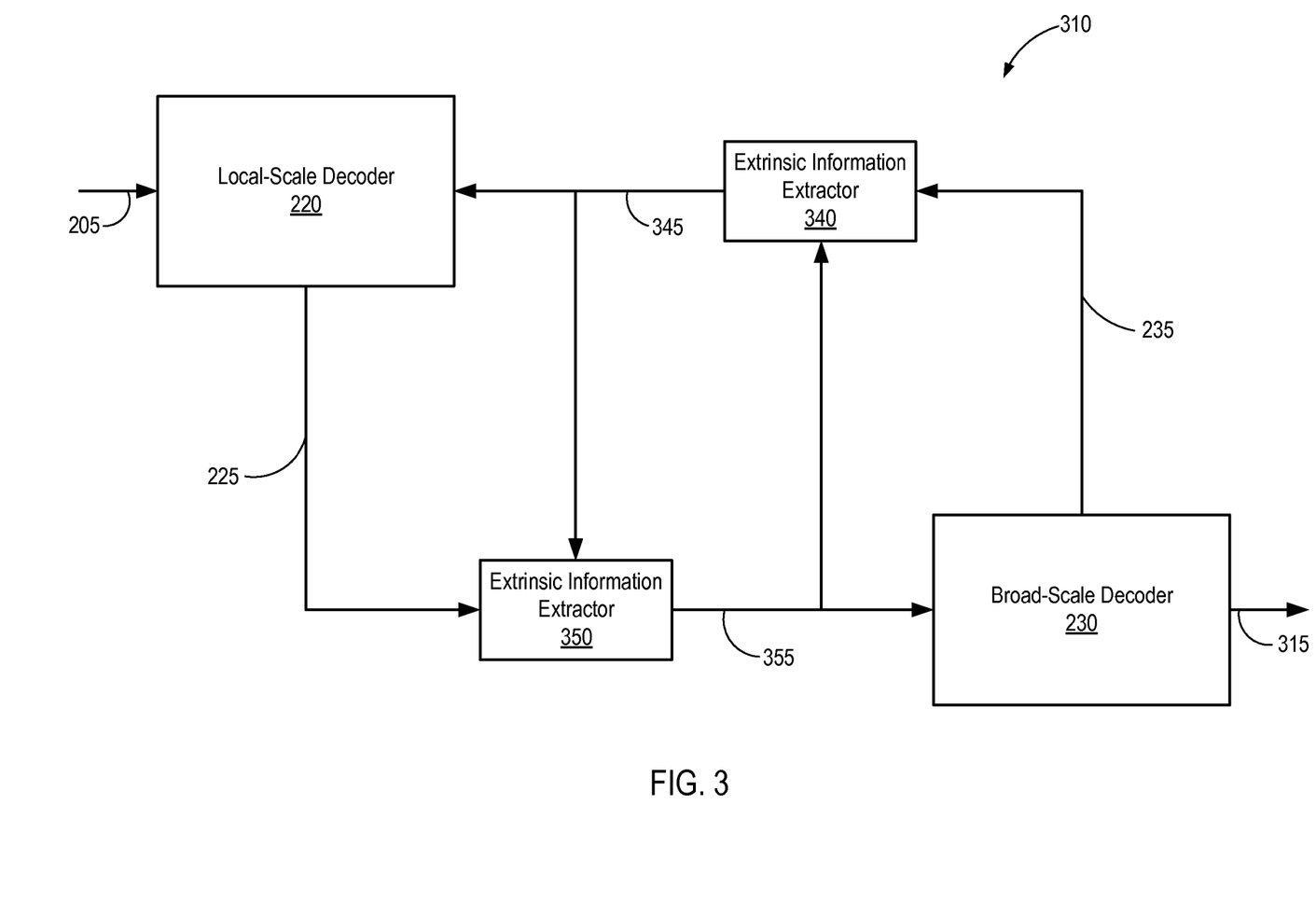
FIG. 3 is a block diagram of a speech recognition system comprising extrinsic information extractors.

FIG. 3 is a block diagram of a speech recognition system 310 comprising extrinsic information extractors 340, 350. When one of the decoders 220, 230 produces soft symbol estimates 225, 235, those estimates may be based in part on the soft symbol estimates 225, 235 received from the other decoder 220, 230. As a result, the decoders' 220, 230 own soft symbol estimates 225, 235 can be fed back to themselves. This positive feedback loop may cause the decoders 220, 230 to increasingly adhere to their own previous decisions even if those decisions are erroneous. Accordingly, the extrinsic information extractors 340, 350 may be used to remove positive feedback and allow only the information that was not previously exploited to be fed back. This new information may be referred to as the extrinsic information 345, 355.

The extrinsic information extractors 340, 350 may take as inputs the extrinsic information 345, 355 input and the soft symbol estimates 225, 235 output by a corresponding decoder 220, 230. The extrinsic information 345, 355 may be input after it has been processed by the other extrinsic information extractor 340, 350. The extrinsic information extractors 340, 350 may then output the extrinsic information 345, 355 to the other decoder 220, 230. In the illustrated embodiment, the extrinsic information extractors 340, 350 are separate from the decoders 220, 230, but they may be incorporated into the decoders 220, 230 in other embodiments. After performing one or more turbo iterations, the speech recognition system 310 may output hard symbol decisions 315.

Figure 4:
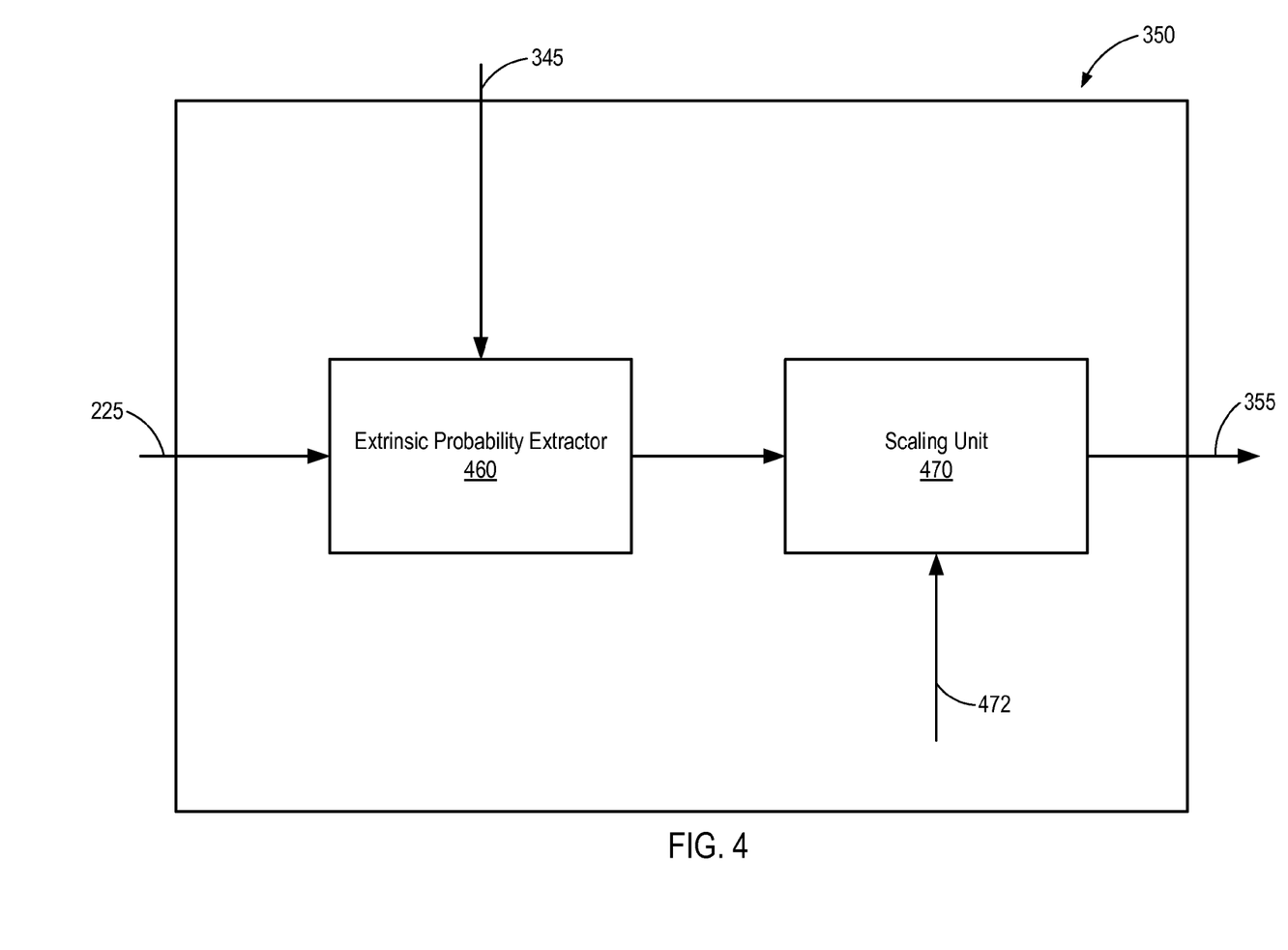
FIG. 4 is a block diagram of an extrinsic information extractor.

FIG. 4 is a block diagram of an extrinsic information extractor 350 for computing extrinsic information. The extrinsic information extractor 350 may receive broad-scale extrinsic information 345 going to the local-scale decoder 220 and local-scale soft symbol estimates 225 computed by the local-scale decoder 220. If S is used to represent the extrinsic phoneme probabilities at a given time and i is one of $N_O$ possible phonemes, then the input broad-scale extrinsic information 345 may be written as $\pi_i=P(S=i)$. Similarly, the local-scale soft symbol estimates 225 may be represented by $r_i=P(S=i|\text{processing in system})$, wherein "processing in system" is the additional information generated by the local-scale decoder 220.

When the information is represented in the form of probabilities, the soft symbol estimates 225 may be rewritten using Bayes' theorem as:

$$r_i = \frac{P(\text{processing in system}|S=i)\pi_i}{\sum_{j=1}^{N_O} P(\text{processing in system}|S=j)\pi_j} \quad (6)$$

The local-scale extrinsic information 355 may then be generated by extracting $P(\text{processing in system}|S=i)$. To extract this term, $r_i$ may be divided by $\pi_i$ and the result can be normalized to a probability represented by $\tilde{e}_i$. The probability $\tilde{e}_i$ may be computed as:

$$\tilde{e}_i = \frac{r_i/\pi_i}{\sum_{j=1}^{N_O} r_j/\pi_j} \quad (7)$$

An extrinsic probability extractor 460 may be used to compute the extrinsic probabilities, $\tilde{e}_i$, from the broad-scale extrinsic information 345 and the local-scale soft symbol estimates 225. When the information is represented in the form of log probabilities, log-likelihood ratios, or the like, the extrinsic information may be computed by a subtraction operation instead of using equation (7).

The speech recognition system 310 may be further enhanced by scaling the extrinsic probabilities. In some embodiments, the scaling factor $\eta$ 472 may be selected to be greater than 0 and less than or equal to 1. In an embodiment, $\eta$ may be 0.05. When the information is represented in the form of probabilities, the scaled extrinsic probabilities may be represented as $e_i$ and computed according to:

$$e_i = \frac{\tilde{e}_i^\eta}{\sum_{j=1}^{N_O} \tilde{e}_j^\eta} \quad (8)$$

When the information is represented in the form of log probabilities, log-likelihood ratios, or the like, the scaling operation may be obtained by linearly scaling by the parameter $\eta$. The scaling may be performed by a scaling unit 470, which inputs extrinsic probabilities and the scaling factor 472 and outputs scaled extrinsic probabilities. The scaled extrinsic probabilities may then be output as local-scale extrinsic information 355 to be sent to the broad-scale decoder 230. The local-scale extrinsic information 355 may be computed from the local-scale soft symbol estimates 225 and the broad-scale extrinsic information 345 by the extrinsic probability extractor 460 and scaling unit 470 using equations (6)-(8). Similarly, the broad-scale extrinsic information 345 may be computed from the broad-scale soft symbol estimates 235 and the local-scale extrinsic information 355 using equations (6)-(8). The forward-backward algorithm incorporating prior probabilities of equations (1)-(5) specified above may be used with extrinsic information 345, 355 by redefining $E_1^T$ to be the extrinsic information 355 received from the extrinsic information extractors 340, 350.

In some embodiments, a synchronizing element (not shown), such as an array of flip-flops, may be inserted between the extrinsic information extractor 340 and the local-scale decoder 220. If the decoders 220, 230 and extrinsic information extractors 340, 350 operate asynchronously, the inputs to the decoders 220, 230 and extrinsic information extractors 340, 350 may begin to change before the output is completely calculated. The changing inputs could interfere with the calculations. Accordingly, a synchronizing element can be used to ensure that a new iteration does not begin before the previous iteration has completed.

The speech recognition system 310 may need to have values assigned to $P(\Psi_1=i)$, $a_{ij}$, and $l(Y_{t+1}|\Psi_{t+1}=j)$. In some embodiments, training data may be used to compute the probabilities for $P(\Psi_1=i)$, $a_{ij}$, and $l(Y_{t+1}|\Psi_{t+1}=j)$. The training data may comprise one or more speech signals where the symbols or text associated with the speech signals has been predetermined. In some cases, the probabilities may be computed directly by calculating the probability of each event in the training data. For example, $a_{ij}$ may be computed by dividing the number of times the training data transitions from state i to state j by the number of times the training data transitions from state i.

Sometimes, the number of instances of each event in the training data cannot be counted directly. In those cases, an initial estimate of the probabilities can be selected. The initial estimates may then be improved by running the speech recognition system 310 on the training data. The experienced probabilities of each event by the decoders 220, 230 may then be used as the new estimates. The training data may be processed by the speech recognition system 310 with each set of new estimates until the estimates converge.

Some probabilities may be zero after the speech recognition system 310 has been initialized. Zero probabilities may sometimes result in poorer performance. Smoothing may be employed to remove any zero probabilities. This may comprise setting any zero probabilities to a predetermined minimum value. In embodiments, some probabilities are smoothed and others are not.

Figure 5:
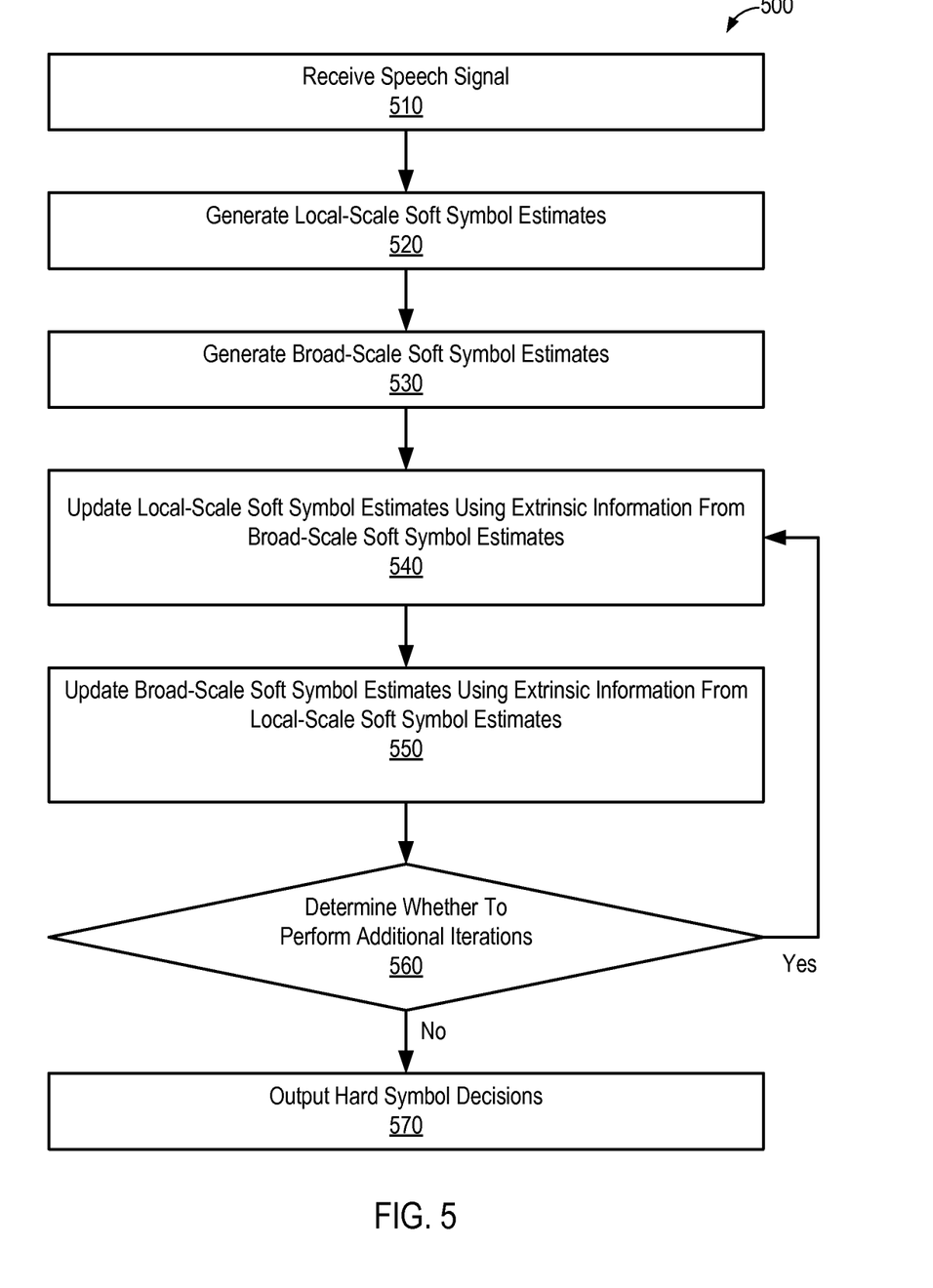
FIG. 5 is a flow diagram of a method for analyzing an unknown speech signal with the speech recognition system.

Once the speech recognition system 310 has been initialized, an unknown speech signal 205 may be analyzed. FIG. 5 is a flow diagram of one embodiment of a method 500 for analyzing the unknown speech signal 205 with the speech recognition system 310 of FIG. 3. First, the speech recognition system 310 may receive 510 the unknown speech signal 205. Receiving may comprise converting the signal format, extracting feature vectors, and/or the like in some embodiments.

Next, the local-scale decoder 220 may generate 520 local-scale soft symbol estimates 225 based on the feature vectors. As previously discussed, this may comprise computing the probability of being in each state of a stacked HMM using the forward-backward algorithm incorporating prior probabilities of equations (1)-(5), and marginalizing the probabilities of the states associated with each symbol. An array of these probabilities for one or more time intervals may be used as the local-scale soft symbol estimates 225. The extrinsic information 345 received by the local-scale decoder 220 at this point may comprise the uniform distribution, which does not affect the computation.

The local-scale soft symbol estimates 225 then may be transmitted from the local-scale decoder 220 to the broad-scale decoder 230. The broad-scale decoder 230 may generate 530 broad-scale soft symbol estimates 235 based on the local-scale soft symbol estimates 225. Because the broad-scale decoder 230 may be analyzing multi-symbol relationships, it may be able to express the broad-scale soft symbol estimates 235 as single symbol probabilities or multi-symbol probabilities. The local-scale and broad-scale decoders 220, 230 may use a common method of expressing the soft symbol estimates 225, 235 for ease of communication. In some embodiments, this common method may comprise expressing the soft symbol estimates 225, 235 as the probabilities for individual symbols. Like the local-scale decoder 220, the broad-scale decoder 230 may use one or more HMMs to compute the soft-symbol estimates 225, 235.

The speech recognition system 310 may then perform one or more turbo iterations. In the illustrated embodiment, a turbo iteration first may comprise the local-scale decoder 220 updating 540 local-scale soft symbol estimates 225 using extrinsic information 345 extracted from the broad-scale soft symbol estimates 235 by the extrinsic information extractor 340. Second, the turbo iteration may comprise the broad-scale decoder 230 updating 550 the broad-scale soft symbol estimates 235 using extrinsic information 355 extracted from the local-scale soft symbol estimates 225 by the extrinsic information extractor 350. The shared extrinsic information 345, 355 may result in the new estimates being more accurate than the previous estimates.

After each turbo iteration, the speech recognition system 310 may determine 560 whether to perform additional iterations. Performing additional turbo iterations may result in additional improvement with diminishing marginal returns for each additional iteration. The speech recognition system 310 may do so by deciding whether the marginal return on additional iterations has fallen below a predetermined threshold. In certain embodiments, this may comprise determining that the broad-scale soft symbol estimates 235 are converging to a fixed value. Convergence may be measured by comparing the broad-scale soft symbol estimates 235 between the current and previous iteration to determine the change between iterations. Alternatively, convergence may be measured by the number of hard symbol decisions that would be different from the previous iteration to the current iteration. Sometimes convergence will not occur, so the speech recognition system 310 may decide not to perform additional iterations once a predetermined number of iterations have occurred without convergence.

Finally, the soft symbol estimates 225, 235 may be converted to hard symbol decisions 315, which are then output 570 by the speech recognition system 310. The hard symbol decisions 315 may be computed by marginalizing the probability associated with each symbol or marginalizing the probability associated with a set of multiple symbols, such as a word. The highest probability symbol or set of multiple symbols at each time t may be selected as the hard symbol decisions 315. Alternatively, the Viterbi algorithm may be used to select the most likely sequence of symbols as the hard symbol decisions 315. In the illustrated embodiment, the broad-scale soft symbol estimates 235 are used to make the hard symbol decisions 315. In other embodiments, the local-scale soft symbol estimates 225 may be used. In certain embodiments, soft symbol estimates 225, 235 may be output in addition to or instead of the hard symbol decisions 315.

Figure 6:
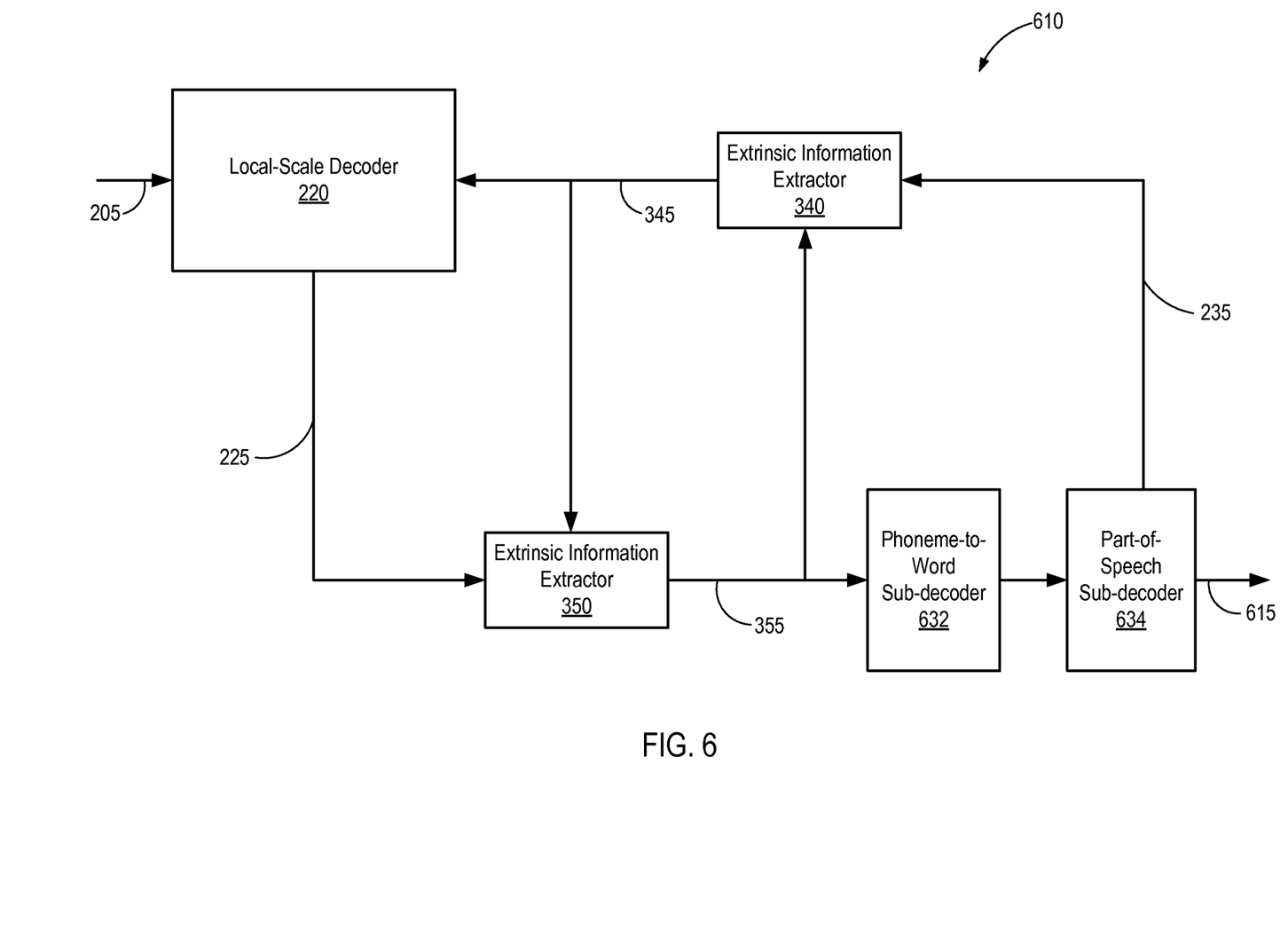
FIG. 6 is a block diagram of a speech recognition system comprising a broad-scale decoder comprising two components for analyzing different levels of detail.

FIG. 6 is a block diagram of a speech recognition system 610 comprising a broad-scale decoder comprising two sub-decoders for analyzing different levels of detail. The use of two sub-decoders allows for the addition of additional scales of granularity. The first sub-decoder may analyze transitions between symbols within blocks of multiple symbols, and the second sub-decoder may analyze transitions among the blocks of multiple symbols. For example, a phoneme-to-word sub-decoder 632 may be used as the first sub-decoder and a grammar or part-of-speech sub-decoder 634 may be used as the second sub-decoder. The phoneme-to-word sub-decoder 632 may comprise an HMM comprising a plurality of stacked HMMs wherein each of the stacked HMMs represents a word and the individual states represent phonemes. A part-of-speech sub-decoder 634 may comprise an HMM with one or more states for each word with the number of states for a word being determined by the number of possible parts of speech for that word. Each state may be referred to as a word-part-of-speech state.

The phoneme-to-word sub-decoder 632 may transmit word probabilities as the soft symbol estimates to the part-of-speech sub-decoder 634 rather than phoneme probabilities. The part-of-speech sub-decoder 634 may transmit phoneme probabilities as the broad-scale soft symbol estimates 235 to the local-scale decoder 220. In the illustrated embodiment, the output from the part-of-speech sub-decoder 634 is not fed back to the phoneme-to-word sub-decoder 632, and there is no extrinsic information extractor between the phoneme-to-word sub-decoder 632 and part-of-speech sub-decoder 634. In other embodiments, the soft symbol estimates 225, 235 may be transferred from the part-of-speech sub-decoder 634 to the phoneme-to-word sub-decoder 632 and/or from the phoneme-to-word sub-decoder 632 to the local-scale decoder. These other embodiments may further comprise additional extrinsic information extractors. After performing one or more turbo iterations, the speech recognition system 310 may output hard symbol decisions 615.

It will be obvious to those having skill in the art that many changes may be made to the details of the above-described embodiments without departing from the underlying principles of the disclosure. The scope of the present disclosure should, therefore, be determined only by the following claims.

What is claimed is:

1. A speech recognition system for recognizing speech, the system comprising:
   one or more processors;
   a local-scale decoder operating on the one or more processors and generating local-scale soft information from a speech signal;
   a first extrinsic information extractor operating on the one or more processors;
   a second extrinsic information extractor operating on the one or more processors; and
   a broad-scale decoder operating on the one or more processors wherein:
   the broad-scale decoder receives the local-scale soft information; and generates broad-scale soft information based on the local-scale soft information, wherein the local-scale decoder and the broad-scale decoder further perform one or more turbo iterations, at least one of the turbo iterations comprising:
   the second extrinsic information extractor scaling extrinsic probabilities from the local-scale soft information and feeding back to the broad-scale decoder only the local-scale soft information that was not previously exploited by the broad-scale decoder;
   the first extrinsic information extractor scaling extrinsic probabilities from the broad-scale soft information and feeding back to the local-scale decoder only the broad-scale soft information that was not previously exploited by the local-scale decoder;
   the local-scale decoder updating the local-scale soft information based on the broad-scale soft information; and
   the broad-scale decoder updating the broad-scale soft information based on the local-scale soft information, wherein a plurality of hard symbol decisions are generated from one of the local-scale and the broad-scale soft information.

2. The system of claim 1, wherein the first extrinsic information extractor computes broad-scale extrinsic information from the broad-scale soft information and local-scale extrinsic information, the second extrinsic information extractor computes the local-scale extrinsic information from the local-scale soft information and the broad-scale extrinsic information, the local-scale decoder updates the local-scale soft information based on the broad-scale extrinsic information, and the broad-scale decoder updates the broad-scale soft information based on the local-scale extrinsic information.

3. The system of claim 1, wherein the local-scale and broad-scale decoders are configured to generate the local-scale and broad-scale soft information using stochastic models.

4. The system of claim 3, wherein the stochastic models comprise hidden Markov models.

5. The system of claim 3, wherein the stochastic models comprise neural networks.

6. The system of claim 1, wherein the local-scale soft information comprises a plurality of local-scale soft symbol estimates of phoneme probabilities and the broad-scale soft information comprises a plurality of broad-scale soft symbol estimates of phoneme-to-phoneme probabilities and word-to-word probabilities.

7. The system of claim 1, wherein the local-scale and broad-scale decoders are further configured to perform the one or more turbo iterations until the sooner of the broad-scale soft information converges within a predetermined threshold and the number of turbo iterations performed reaches a predetermined threshold.

8. The system of claim 1, wherein the broad-scale decoder further comprises first and second sub-decoders, wherein the first sub-decoder is configured to analyze transitions between symbols within blocks comprising a plurality of symbols, and wherein the second sub-decoder is configured to analyze transitions between the blocks.

9. A computer-implemented method of recognizing speech, the method comprising:
   local-scale decoding a speech signal to generate local-scale soft information using one or more processors;
   broad-scale decoding the local-scale soft information to generate broad-scale soft information based on the local-scale soft information;
   performing one or more turbo iterations, each turbo iteration comprising:
   scaling extrinsic probabilities from the local-scale soft information and feeding back to the broad-scale decoding only the local-scale soft information that was not previously exploited by the broad-scale decoding;
   scaling extrinsic probabilities from the broad-scale soft information and feeding back to the local-scale decoding only the broad-scale soft information that was not previously exploited by the local-scale decoding;
updating the local-scale soft information based on the broad-scale soft information;
updating the broad-scale soft information based on the local-scale soft information; and
generating a plurality of hard symbol decisions based on one of the local-scale and the broad-scale soft information.

10. The method of claim 9, further comprising:
extracting broad-scale extrinsic information from the broad-scale soft information and local-scale extrinsic information; and
extracting the local-scale extrinsic information from the local-scale soft information and the broad-scale extrinsic information, wherein updating the local-scale soft information comprises updating the local-scale soft information based on the broad-scale extrinsic information, and wherein updating the broad-scale soft information comprises updating the broad-scale soft information based on the local-scale extrinsic information.

11. The method of claim 9, wherein the local-scale decoding and the broad-scale decoding comprise generating the local-scale and broad-scale soft information using stochastic models.

12. The method of claim 11, wherein the stochastic models comprise hidden Markov models.

13. The method of claim 12, further comprising computing a plurality of probabilities of being in a corresponding plurality of states with a forward-backward algorithm incorporating prior probabilities.

14. The method of claim 11, wherein the stochastic models comprise neural networks.

15. The method of claim 9, wherein the local-scale soft information comprises a plurality of local-scale soft symbol estimates of phoneme probabilities and the broad-scale soft information comprises a plurality of broad-scale soft symbol estimates of phoneme-to-phoneme probabilities and word-to-word probabilities.

16. The method of claim 9, wherein performing one or more turbo iterations comprises performing the one or more turbo iterations until the sooner of the broad-scale soft information converges within a predetermined threshold and the number of turbo iterations performed reaches a predetermined threshold.

17. The method of claim 9, wherein broad-scale decoding further comprises: analyzing transitions between symbols within blocks comprising a plurality of symbols, and analyzing transitions between the blocks.

18. A speech recognition computer system for recognizing speech, the system comprising:
a processor; and
a memory in electrical communication with the processor, the memory comprising:
a local-scale decoder configured to receive broad-scale soft information and generate local-scale soft information from a speech signal and the broad-scale soft information;
a first extrinsic information extractor;
a second extrinsic information extractor; and
a broad-scale decoder configured to receive the local-scale soft information from the local-scale decoder and generate the broad-scale soft information from the local-scale soft information, wherein the local-scale decoder and the broad-scale decoder are configured to perform one or more turbo iterations comprising:
the second extrinsic information extractor scaling extrinsic probabilities from the local-scale soft information and feeding back to the broad-scale decoder only the local-scale soft information that was not previously exploited by the broad-scale decoder;
the first extrinsic information extractor scaling extrinsic probabilities from the broad-scale soft information and feeding back to the local-scale decoder only the broad-scale soft information that was not previously exploited by the local-scale decoder;
the local-scale decoder updating the local-scale soft information based on the broad-scale soft information; and
the broad-scale decoder updating the broad-scale soft information based on the local-scale soft information, wherein a plurality of hard symbol decisions are generated from one of the local-scale and the broad-scale soft information.

19. The system of claim 18, wherein the first extrinsic information extractor is configured to compute broad-scale extrinsic information from the broad-scale soft information and local-scale extrinsic information, the second extrinsic information extractor configured to compute the local-scale extrinsic information from the local-scale soft information and the broad-scale extrinsic information, the local-scale decoder is configured to receive the broad-scale soft information by receiving the broad-scale extrinsic information, and the broad-scale decoder is configured to receive the local-scale soft information by receiving the local-scale extrinsic information.

20. The system of claim 18, wherein the local-scale and broad-scale decoders are configured to generate the local-scale and broad-scale soft information using stochastic models.

21. The system of claim 20, wherein the stochastic models comprise hidden Markov models.

22. The system of claim 21, wherein the local-scale and broad-scale decoders are configured to generate the local-scale and broad-scale soft information by marginalizing a plurality of probabilities of being in a corresponding plurality of states of the hidden Markov models.

23. The system of claim 22, wherein the local-scale and broad-scale decoders are further configured to compute the plurality of probabilities of being in the corresponding plurality of states with a forward-backward algorithm incorporating prior probabilities.

24. The system of claim 20, wherein the stochastic models comprise neural networks.

25. The system of claim 18, wherein the local-scale soft information comprises a plurality of local-scale soft symbol estimates of phoneme probabilities and the broad-scale soft information comprises a plurality of broad-scale soft symbol estimates of phoneme-to-phoneme probabilities and word-to-word probabilities.

26. The system of claim 25, wherein the broad-scale decoder is further configured to initialize the plurality of broad-scale soft symbol estimates to comprise a uniform distribution.

27. The system of claim 18, wherein the local-scale and broad-scale decoders are further configured to perform the one or more turbo iterations until the sooner of the broad-scale soft information converges within a predetermined threshold and the number of turbo iterations performed reaches a predetermined threshold.

28. The system of claim 18, wherein the broad-scale decoder further comprises first and second sub-decoders, wherein the first sub-decoder is configured to analyze transitions between symbols within blocks comprising a plurality of symbols, and wherein the second sub-decoder is configured to analyze transitions between the blocks.

29. A non-transitory computer-readable storage medium comprising program code for performing a method for recognizing speech, the method comprising:

local-scale decoding a speech signal to generate local-scale soft information, wherein the local-scale soft information comprises a plurality of local-scale soft symbol estimates of phoneme probabilities;

broad-scale decoding the local-scale soft information to generate broad-scale soft information based on the local-scale soft information, wherein the broad-scale soft information comprises a plurality of broad-scale soft symbol estimates of phoneme-to-phoneme probabilities and word-to-word probabilities;

performing one or more turbo iterations, each turbo iteration comprising:

scaling extrinsic probabilities from the local-scale soft information and feeding back to the broad-scale decoding only the local-scale soft information that was not previously exploited by the broad-scale decoding;

scaling extrinsic probabilities from the broad-scale soft information and feeding back to the local-scale decoding only the broad-scale soft information that was not previously exploited by the local-scale decoding;

updating the local-scale soft information based on the broad-scale soft information;

updating the broad-scale soft information based on the local-scale soft information; and generating a plurality of hard symbol decisions based on one of the local-scale and the broad-scale soft information.

* * * * *